Patented Aug. 4, 1953

2,648,058

UNITED STATES PATENT OFFICE 2,648,058

LIQUID LEVEL INDICATING DEVICE

Harry B. Breedlove, Baton Rouge, La., assignor to Standard Oil Development Company, a corporation of Delaware Application May 17, 1951, Serial No. 226,805

3 Claims. (Cl. 340—199)

1

This invention relates to liquid electrolyte level sensitive apparatus in general and more particularly relates to an apparatus of this type to indicate the presence or absence of foam or emulsion.

It is an object of this invention to provide a liquid electrolyte level indicator which is dependable, unaffected by non-conductive suspended matter in the electrolyte, relatively insensitive to changes in concentration of the electrolyte and without any corrodible or moving parts exposed to the liquid electrolyte.

In accordance with these and other objects, this invention provides a liquid level indicator comprising a signal generator feeding two inductance coils which are electrically connected to produce a magnetic field 180° out of phase, an interposed coil arranged to detect the degree of unbalance of the magnetic fields, an amplifier arranged to amplify any unbalance signal produced, and means to detect the difference in strength of the signal produced by the signal generator and the unbalance signal produced in the interposed pick-up coil.

An apparatus of this type is particularly suitable for detecting the height of foams or emulsion formed in the operation of many industrial processes and has particular application in the detection of foams and emulsion formed in artificial latices obtained as one step in the preparation of synthetic rubber by the emulsion technique.

Figure 1:
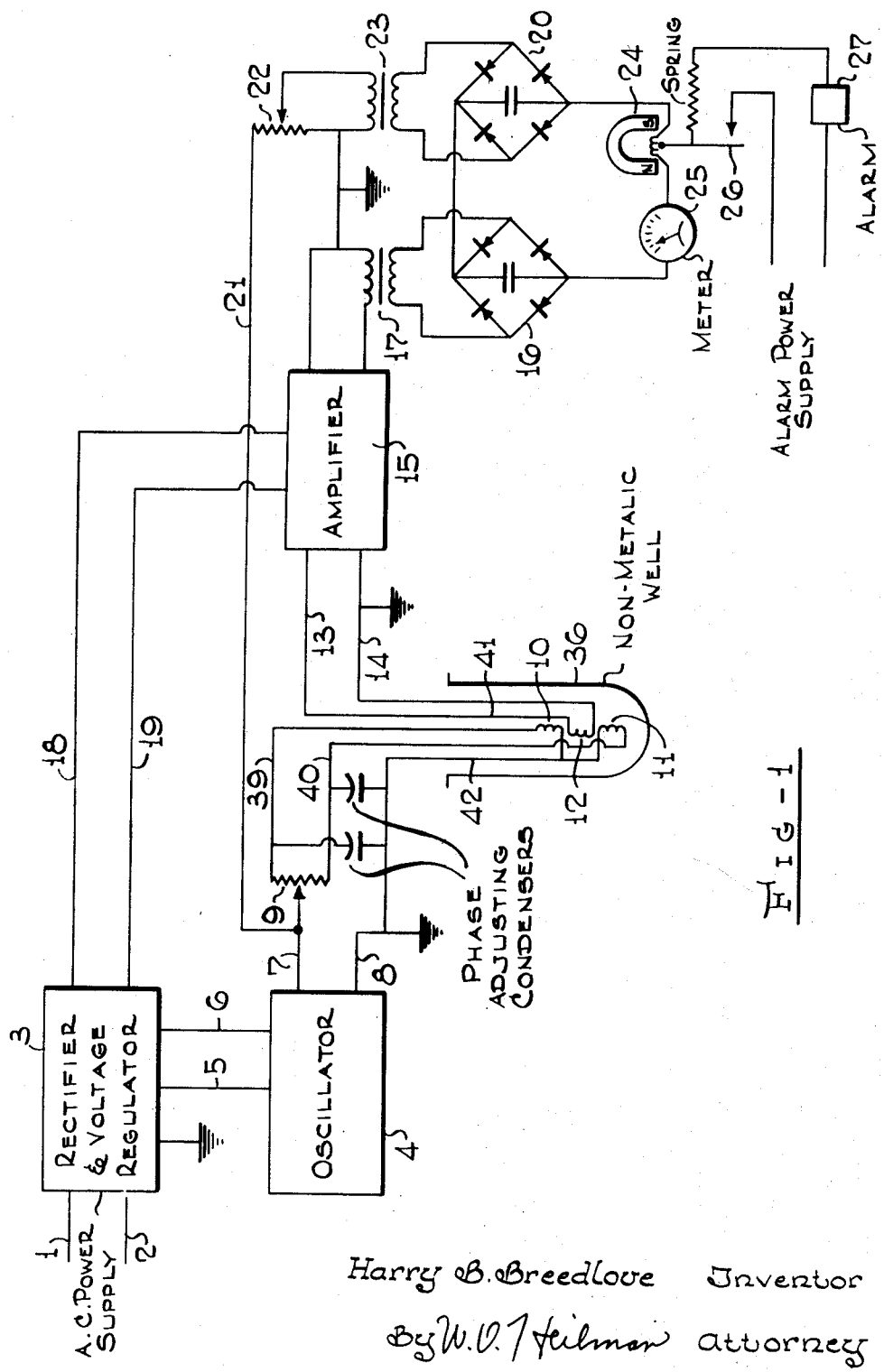
Figure 2:
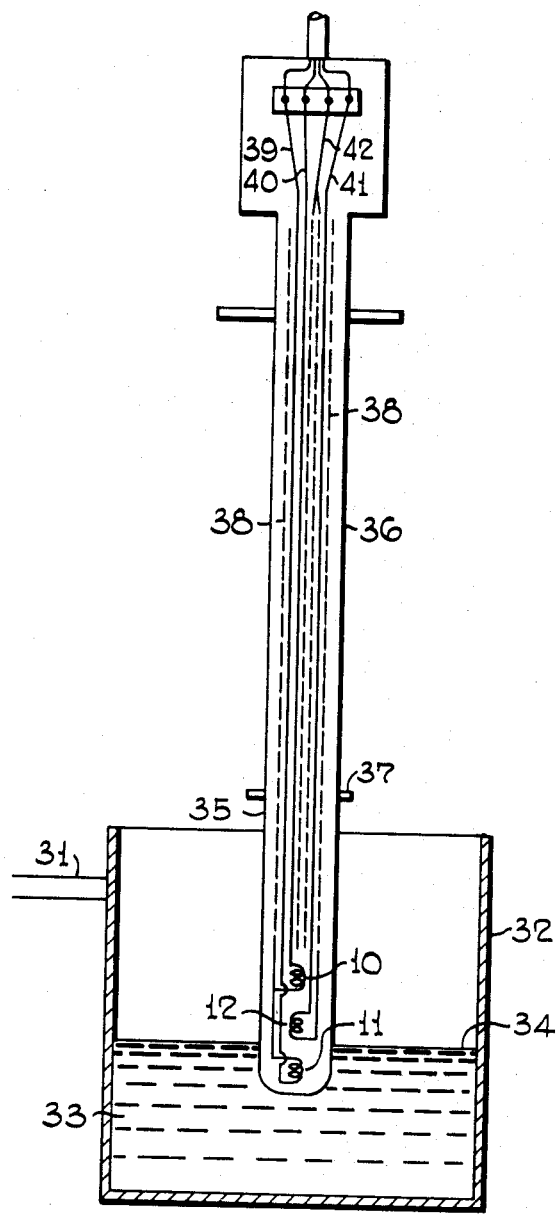

The invention will be understood more readily in the detailed description thereof taken in connection with the accompanying drawing in which:

Fig. 1 is a diagrammatic representation of the general circuit layout of the present invention, and Fig. 2 is a longitudinal cross-sectional view of the glass and metal well assembly containing the inductance coils.

Referring now to Figure 1, alternating current is supplied through leads 1 and 2 to a conventional rectifier and voltage regulator 3. Oscillator 4 is a Wein bridge thermionic valve device operating at approximately 7000 cycles per second and is connected to rectifier and voltage regulator 3 by leads 5 and 6. The output from oscillator 4 feeds through discharge leads 7 and 8 and amplitude adjusting potentiometer 9 into inductance coils 10 and 11 connected so as to produce a magnetic field 180° out of phase. Interposed between coils 10 and 11 is coil 12 which is connected by conductors 13 and 14 to amplifier 15, the output of which is fed to bridge-type rectifier 16 through isolation transformer 17. Electric power for the operation of amplifier 15 is supplied from rectifier and voltage regulator 3 through leads 18 and 19. A signal from oscillator 4 also feeds a second bridge type rectifier 20 through conductor 21, amplitude control potentiometer 22, and isolation transformer 23. The output from the two bridge rectifiers is connected in series with relay 24 and milliammeter 25. The rectifiers 16 and 20 are connected in opposition so that the current flowing through relay 24 and meter 25 is the difference between the two currents flowing in the two rectifiers. Relay 24 is of the normally closed type. The current from the oscillator is sufficient to hold it open. The contacts 26 of relay 24 are connected in series with alarm means 27 and a power source (not shown). If desired, additional relays may be added in relay 24 circuit where high current carrying capacity is necessary. Any failure in the equipment will cause contacts 26 of relay 24 to close, setting off the alarm.

The operation of the device is as follows:

The oscillator or signal generator 4 is adjusted to the resonant frequency of the inductance coils 10, 11 and 12. The signal fed to the two outer coils 10 and 11 is adjusted in amplitude and phase to produce a minimum signal in coil 12. At the same time a signal from the oscillator 4 is fed to the bridge rectifier 20. The output signal from the amplifier 15 is fed to the second bridge rectifier 16 which is connected in opposition to rectifier 20. Any signal from coil 12 amplified in amplifier 15 will thus oppose the current from the oscillator 4 and cause relay 24 to close operating the alarm 27.

Referring now to Figure 2, reference character 31 designates the liquid input to a container 32. The container 32 contains liquid 33 at a variable level 34. A glass hollow member 35 depends from a metallic pipe 36 by means of adapter 37. The hollow member 35 is sealed at its lower end to exclude liquid and is partly immersed therein so that coil 11 is just above the liquid level. It supports therein the two outer inductance coils 10 and 11 and interposed detector coil 12, each grounded to metal shield 38. Inductor leads 39 and 40 are connected to the two outer coils and lead 41 to the interposed coil. Metal shield 38 is connected to ground lead 42.

When the foam, emulsion or liquid dielectric level in the vessel is below coil 11, the magnetic field around coils 10 and 11 is balanced and the signal picked up by coil 12 is at a minimum and the relay 24 is held open. Whenever the level rises around the inductance coils 10 and 11 the strength of the magnetic fields around these coils is unbalanced and a signal is produced in coil 12. This signal is amplified and rectified and opposes the current in the relay circuit and closes relay 24 setting off the alarm 27.

The nature of the present invention having been thus fully set forth and specific examples of the same given, what is claimed as new and useful and desired to be secured by Letters Patent is:

1. Apparatus for detecting variation of level of liquids in a container vessel therefor, comprising a hollow casing member suspended within said vessel and sealed from communication therewith, a pair of inductance coil elements extended into said casing member disposed in spaced relation longitudinally of said casing, said elements each connected in an electric circuit to produce a magnetic field about each coil of substantially balanced strength substantially 180° out of phase, a third coil, interposed between said pair of coils within said magnetic fields, connected in a circuit adapted to transmit an induced current in said third coil upon variation of the strength of one of said magnetic fields and means for registering said induced current.

2. An apparatus according to claim 1 in which said casing and the coils therein are disposed within said vessel with said coils above the normal upper level of the liquid contained in said vessel.

3. An apparatus for sensing variation in the level of liquids in a container vessel therefor, comprising a pair of inductance coils, each connected in an electrical circuit adapted to produce substantially balanced magnetic fields 180° out of phase, disposed in a surrounding media of substantially uniform reluctance within said vessel, a third coil interposed between said pair of coils adapted to receive and transmit an induced current produced by unbalance of said magnetic fields upon variation of the media surrounding either or both said pairs of inductance coils, and means for registering said induced current connected to said third coil.

HARRY B. BREEDLOVE.

References Cited in the file of this patent

UNITED STATES PATENTS

| Number | Name | Date |
|---|---|---|
| 2,136,219 | Scherbatskoy | Nov. 8, 1938 |
| 2,196,809 | Hoadley | Apr. 9, 1940 |
| 2,240,184 | Hathaway | Apr. 29, 1941 |
| 2,260,837 | Kuehni | Oct. 28, 1941 |
| 2,420,160 | Adamson | May 6, 1947 |

OTHER REFERENCES

Journal of Scientific Instruments. January 1948, pages 4–6.